| United States Patent [19] | [11] | 4,348,459 |
|---|---|---|
| Drzal et al. | [45] | Sep. 7, 1982 |

[54] THERMOPLASTIC ELASTOMER AND ELECTRICAL ARTICLE INSULATED THEREWITH

[75] Inventors: Robert S. Drzal, Naugatuck; Charles D. Shedd, Waterbury, both of Conn.

[73] Assignee: Uniroyal, Inc., New York, N.Y.

[21] Appl. No.: 205,226

[22] Filed: Nov. 10, 1980

[51] Int. Cl.$^3$ .................. B32B 15/00; B32B 15/08; C08K 5/01

[52] U.S. Cl. .................. 428/379; 428/378; 525/211; 525/232; 525/240; 524/425; 524/451; 524/525

[58] Field of Search ............... 260/33.6 AQ; 525/211, 525/232, 240; 428/378, 379

[56] References Cited

U.S. PATENT DOCUMENTS

| 3,758,643 | 9/1973 | Fischer et al. | 525/211 |
|---|---|---|---|
| 3,806,558 | 4/1974 | Fischer | 525/198 |
| 3,835,201 | 9/1974 | Fischer | 525/211 |
| 3,852,225 | 12/1974 | Ishikawa et al. | 260/33.6 AQ |
| 3,873,348 | 3/1975 | Reilly et al. | 260/33.6 AQ |
| 3,919,358 | 11/1975 | Batiuk et al. | 525/211 |
| 3,951,871 | 4/1976 | Lloyd et al. | 525/227 |
| 4,036,912 | 7/1977 | Stricharczuk | 525/211 |
| 4,046,840 | 9/1977 | Carman et al. | 525/211 |
| 4,132,698 | 1/1979 | Gessler et al. | 260/33.6 AQ |
| 4,212,787 | 7/1980 | Matsuda et al. | 525/211 |

FOREIGN PATENT DOCUMENTS 1532350 11/1978 United Kingdom .
1550207 8/1979 United Kingdom .

OTHER PUBLICATIONS

Derwent Abs. 84112 A/47 (BE867236) 11-20-78 Raychem Corp.
Derwent Abs. 57141 B/31 (J54078744) 6-23-79 Sumitomo.
Derwent Abs. 41159 X/22 (J51045185) 4-17-76 Sumitomo.

*Primary Examiner*—Melvyn I. Marquis
*Assistant Examiner*—Herbert J. Lilling
*Attorney, Agent, or Firm*—Marvin Bressler

[57] ABSTRACT

A thermoplastic elastomeric, uncured or partially cured, composition of EPDM, polypropylene, extender oil and inorganic filler useful for making electrical cords and fittings.

9 Claims, No Drawings

THERMOPLASTIC ELASTOMER AND ELECTRICAL ARTICLE INSULATED THEREWITH

This invention relates to a thermoplastic elastomer and to an electrical article insulated therewith.

In one aspect, the invention is directed to a thermoplastic elastomeric composition suitable for making electrical plugs, connectors and cables or the like comprising a blend of:
- (a) ethylene-propylene-non-conjugated diene terpolymer rubber having an ethylene content of from 70 to 85 percent by weight and a gel content of from 10 to 45%, preferably 15 to 35%, by weight measured in cyclohexane at room temperature;
- (b) an essentially crystalline propylene polymer;
- (c) a naphthenic or paraffinic extender oil; and
- (d) an inorganic (non-black) filler suitable to absorb at least a portion of said extender oil (c);

wherein the weight ratio of (a)/(b) is from 90/10 to 25/75, preferably from 80/20 to 40/60, the concentration of (c) is from 20 to 100 parts per 100 parts by weight of (a) plus (b), the concentration of (d) is from 10 to 100 parts per 100 parts by weight of (a) plus (b), and the weight ratio of (c)/(d) does not exceed 2.5/1.

Various thermoplastic elastomers based on blends of EP (ethylene-propylene) rubbers and poly-alpha-olefin resins, some of which blends include oil, are known. Representative references of interest include U.S. Pat. Nos. 3,806,558, Apr. 23, 1974 (Fischer); 4,031,169, June 21, 1977 (Morris); 4,036,912, July 19, 1977 (Stricharczuk); and 4,132,698, Jan. 2, 1979 (Gessler et al.). The present invention differs from such prior practices in the specific composition and use of the material.

The instant compositions are characterized by unusual resistance to high temperatures and they therefore provide an improved margin of safety over materials commonly used for electrical insulation, especially polyvinyl chloride, when the electrical articles made therefrom are subjected to excessive heat due to overload or other causes. Furthermore, electrical plugs, connectors or the like made from the present composition need no additional cure and may be readily formed by injection molding, if desired directly onto an electrical cord or a cable. In this way a moisture impenetrable seal is formed between the plug or connector and the cord or cable, making the final product suitable for outdoor usage. Use of the present composition for the fittings and the insulating covering on the cords insures compatability and fusability, so that a strong, integral union is formed during the molding operation.

The ethylene-propylene-non-conjugated diene terpolymer (a) employed in the invention preferably contains 70–85% of ethylene, 28–13% of propylene and 2–20% of non-conjugated diene (by weight). Examples of suitable non-conjugated dienes are dicyclopentadiene, 5-ethylidene-2-norbornene and 1,4-hexadiene. The terpolymer employed contains from 10 to 45%, preferably 15 to 35%, by weight, of gel, measured in cyclohexane at room temperature.

The essentially crystalline propylene polymer (b) employed in the invention is polypropylene homopolymer resin or a propylene copolymer resin, preferably having a melt flow index of from 0.4 to 20.

The compositions of the invention are readily prepared using suitable mixing equipment such as an internal mixer, compounding extruder or an open mill. All the ingredients may be charged initially to the mixing device, although it is advisable to add the extender oil (c) incrementally especially at relatively high oil concentrations. It is essential that during the blending operation the temperature be brought at least up to the crystalline melting point of the propylene homo- or co-polymer, thus assuring complete melting of said homo- or co-polymer.

Ordinarily, mixing is carried out for about 5 to 10 minutes including one minute or more at or above the crystalline melting point of the polypropylene polymer.

If partial cure of the blend is desired, a suitable curative may be added following the procedure of U.S. Pat. No. 3,806,558, Apr. 23, 1974 (Fischer) hereby incorporated by reference. It will be understood that the partial cure is sufficient to lightly crosslink the material without destroying its thermoplastic nature, i.e., its ability to be processed and reprocessed repeatedly.

The preferred flexural moduli of the composition of the invention range from 3,000 to 12,000 psi (20.7–83 Mpa) for cord or cable jacketing and from 6,000 to 15,000 psi (41.4–103.5 MPa) for fittings such as plugs and connectors. Extrusion value (capillary rheometer) should preferably range from 110 to 200 lbs. (50–91 kg), most preferably from 150 to 180 lbs. (68–82 kg) for jacketing and preferably from 80 to 180 lbs. (36–82 kg), most preferably from 100 to 120 lbs. (45–55 kg) for plugs and connectors.

Imperfections of the shaped articles may occur at times due to gate distortion (e.g., swirls); a partial cure of the composition during or after the blending step and prior to molding usually overcomes such difficulty.

EXAMPLE I

Several compositions are prepared using the following ingredients:
- EPDM/I: ethylene=49%, propylene=46%, DCPD=5%, ML-4=60 at 125° C.
- EPDM/II: ethylene=65%, propylene=30%, DCPD=5%; ML-4=42 at 125° C.
- EPDM/III: ethylene=71%, propylene=24%, DCPD=5%, ML-4=50 at 125° C. (all by weight).
- Propylene (PP): MFI=11 (ASTM).
- Extender Oil: Paraffinic, viscosity 61.5 at 100° C. (SUS), molecular weight ca. 530.
- Curative: Alpha, alpha'-bis(t-butylperoxy) diisopropylbenzene, Vul-Cup (trademark) 40KE; 40% active.

The above ingredients, except the extender oil, are charged to a Banbury (trademark) type B internal mixer at room temperature (no cooling or heating is applied to the mixer). Using a No. 2 speed, the chart temperature (indicating essentially the temperature on the internal wall of the mixer) reaches 100° C. within 30 seconds at which time one-half the extender oil is introduced and mixing is continued for about one minute, after which time the temperature is 138° C. The remaining portion of extender oil is charged, and blending is continued for two minutes; the temperature reaches 160° C. Mixing is continued for an additional two minutes, then the composition is dumped, sheeted off on a mill and diced.

It should be noted that it has been observed that actual batch temperatures are about 15° to 20° C. higher than the ones indicated on the chart.

Test samples: Eight placques 3"×6"×0.125" (7.62 cm×15.24 cm×0.3175 cm) from each run are prepared by injection molding the material using a Negri-Bossi (trademark) machine at 193° C. throughout and 400 psi (2.76 MPa) pressure.

Strips (1.5 inch×0.030 inch; 3.81 cm×0.076 cm) are extruded employing a Davis Standard (trademark) 1½ inch (3.81 cm) extruder using the following temperature profile: rear (190° C.), center (204°-216°-232° C.), die (232° C.) at 60 RPM.

The samples are tested with the results summarized in Table I.

| Testing Procedures: |
| --- |
| Tensile, elongation - ASTM D-412 |
| Hardness - Shore A |
| Flex. Modulus - ASTM D-790 proc. B |
| Extrusion - Instron (trademark) |
| Capillary rheometer |
| Capillary diameter |
| = 1.524 mm. |

TABLE I

| Run No. | 1 | 2 | 3 | 4 | 5 | 6 | 7 | 8 | 9 | 10 | 11 |
| --- | --- | --- | --- | --- | --- | --- | --- | --- | --- | --- | --- |
| Recipe | | | | | (Parts by weight) | | | | | | |
| EPDM/I | — | — | — | — | — | — | — | — | — | 60 | |
| EPDM/II | — | — | — | — | — | — | — | — | — | — | 60 |
| EPDM/III | 80 | 60 | 40 | 60 | 60 | 60 | 60 | 60 | 60 | — | — |
| PP | 20 | 40 | 60 | 40 | 40 | 40 | 40 | 40 | 40 | 40 | 40 |
| CaCO$_3$ | 40 | 40 | 40 | 40 | 40 | 40 | 40 | — | 40 | 40 | 40 |
| Talc | — | — | — | — | — | — | — | 40 | — | — | — |
| Extender Oil | 50 | 50 | 50 | 50 | 50 | 80 | 20 | 50 | 50 | 50 | 50 |
| Curative 100% Active | — | — | — | — | — | — | — | — | 0.16 | — | — |
| Physical Properties - Placques | | | | | | | | | | | |
| Tensile, k/Pa | 4800 | 5450 | 7040 | 4900 | 5870 | 4810 | 7450 | 4970 | 4900 | 6140 | 3380 |
| % Elongation, % | 690 | 660 | 560 | 600 | 660 | 630 | 580 | 520 | 500 | 490 | 390 |
| Shore A Hardness | 70 | 83 | 92 | 84 | 82 | 76 | 90 | 95 | 84 | 80 | 80 |
| Flex Mod, MPa | 24.2 | 73.8 | 179 | 83 | 81.4 | 35.9 | 172.5 | 99.4 | 74.5 | 58 | 59.3 |
| Extrusion, Kg at 410 sec$^{-1}$, 95.5° C. | 86 | 52 | 37 | 55 | 47 | 31 | 87 | 51 | 49 | 45 | 47 |
| Physical Properties - Strips | | | | | | | | | | | |
| Tensile, kPa | 4760 | 6490 | 7660 | 6830 | 7250 | 4550 | 9660 | 5590 | 4550 | 5520 | 5450 |
| % Elongation, % | 810 | 710 | 550 | 660 | 690 | 690 | 630 | 530 | 510 | 580 | 610 |
| Shore A Hardness | 54 | 70 | 81 | 75 | 75 | 64 | 79 | 79 | 75 | 74 | 74 |

Cable jacketing, plugs and connectors were produced from the above compositions. Cable jacketing made from runs 1, 2, 4, 5, 6 and 9 excelled in flexibility and tensile strength, combining ease of use with durability; plugs and connectors made from runs 2, 3, 4, 5, 7–9 exhibited resistance to deformation combined with strength. Seals between jacketing and fittings were tight and could not be broken by hand flexing (180°) of cord at point where jacket meets the fitting.

What is claimed is:

1. An electrical plug or connector made from a composition comprising
    (a) ethylene-propylene non-conjugated diene terpolymer rubber having an ethylene content of from 70 to 85 percent by weight and a gel content of from 10 to 45% by weight measured in cyclohexane at room temperature;
    (b) an essentially crystalline propylene polymer;
    (c) a naphthenic or paraffinic extender oil; and
    (d) an inorganic filler suitable to absorb at least a portion of said extender oil (c);
wherein the weight ratio of (a)/(b) is from 90/10 to 25/75, the concentration of (c) is from 20 to 100 parts per 100 parts by weight of (a) plus (b), the concentration of (d) is from 10 to 100 parts per 100 parts by weight of (a) plus (b), and the weight ratio of (c)/(d) does not exceed 2.5/1; said composition having a flexural modulus of from 6,000 to 15,000 psi and an extrusion value of from 110 to 200 pounds measured by capillary rheometer.

2. An electrical cord or cable insulated with a jacketing material made from a composition comprising:
    (a) ethylene-propylene non-conjugated diene terpolymer rubber having an ethylene content of from 70 to 85 percent by weight and a gel content of from 10 to 45% by weight measured in cyclohexane at room temperature;
    (b) an essentially crystalline propylene polymer;
    (c) a naphthenic or paraffinic extender oil; and
    (d) an inorganic filler suitable to absorb at least a portion of said extender oil (c);
wherein the weight ratio of (a)/(b) is from 90/10 to 25/75, the concentration of (c) is from 20 to 100 parts per 100 parts by weight of (a) plub (b), the concentration of (d) is from 10 to 100 parts per 100 parts by weight of (a) plus (b), and the weight ratio of (c)/(d) does not exceed 2.5/1; said composition having a flexural modulus of from 6,000 to 15,000 psi and an extrusion value of from 80 to 180 pounds measured by capillary rheometer.

3. The electrical plug or connector according to claim 1 wherein the inorganic filler is talc.

4. The electrical cord or cable according to claim 2 wherein the inorganic filler is calcium carbonate.

5. The device of claims 1 or 2 wherein the composition is partially cured.

6. The device of claims 1 or 2 wherein the extender oil is paraffinic.

7. The device of claims 1 or 2 wherein the ratio of (a) to (b) is 80/20 to 40/60.

8. An electrical plug or connector as in claim 3 in which the composition is made by mixing (a), (b) and (d) in an internal mixer at elevated temperature and thereafter adding (c) incrementally and continuing the mixing, the mixing temperature being brought up at least to the crystalline melting point of (b).

9. An electrical cord or cable insulated with jacketing as in claim 4 in which the composition is made by mixing (a), (b) and (d) in an internal mixer at elevated temperature and thereafter adding (c) incrementally and continuing the mixing, the mixing temperature being brought up at least to the crystalline melting point of (b).

* * * * *